(No Model.)
G. M. REED.
PLACER MACHINE.
No. 488,452. Patented Dec. 20, 1892.
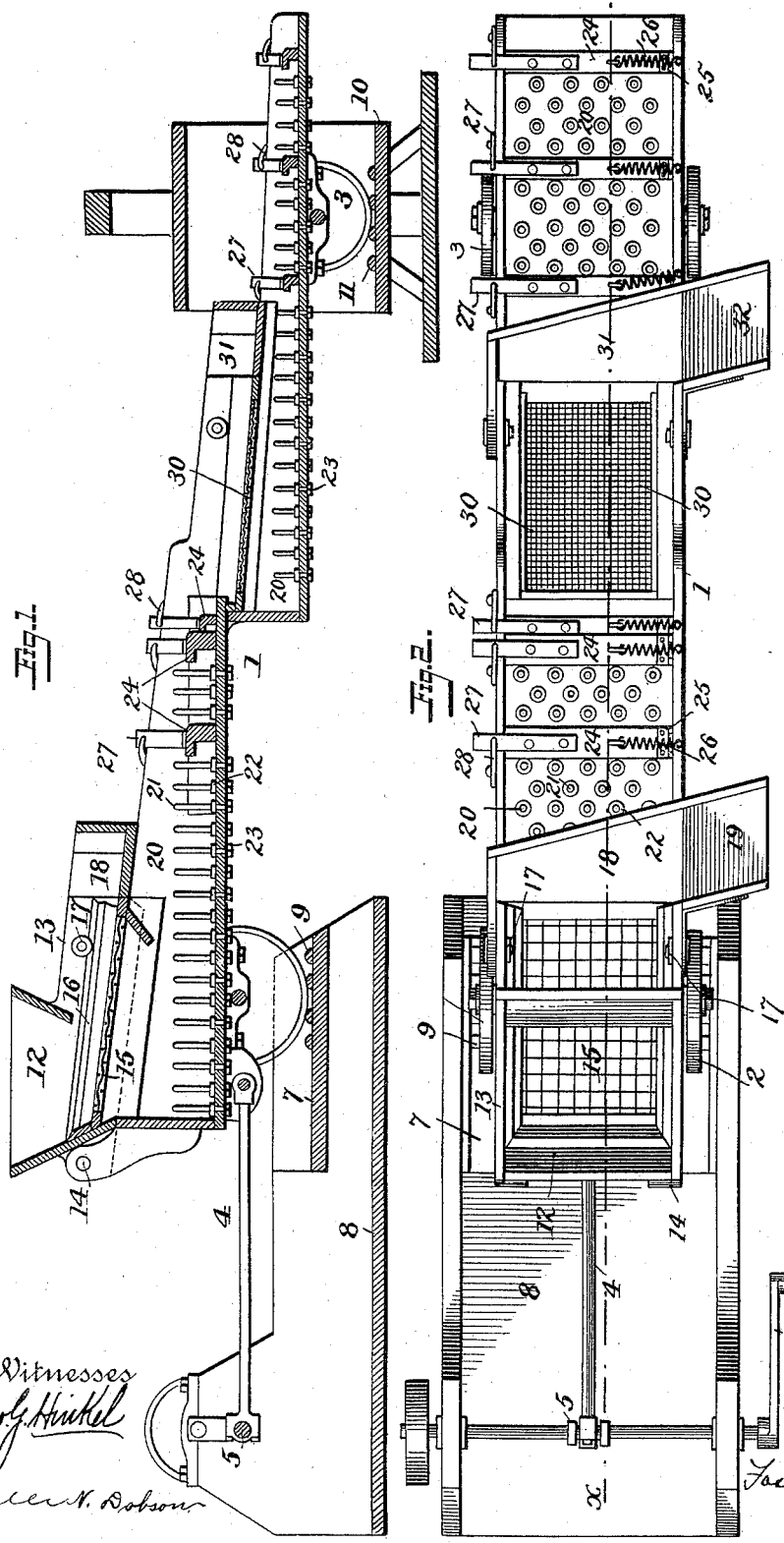

UNITED STATES PATENT OFFICE.

GEORGE MELVILLE REED, OF WALTHAM, ASSIGNOR OF ONE-HALF TO DANIEL H. BISHOP, OF BOSTON, MASSACHUSETTS.

PLACER-MACHINE.

SPECIFICATION forming part of Letters Patent No. 488,452, dated December 20, 1892.

Application filed May 27, 1892. Serial No. 434,663. (No model.)

*To all whom it may concern:*

Be it known that I, GEORGE MELVILLE REED, a citizen of the United States, and a resident of Waltham, Middlesex county, Massachusetts, have invented certain new and useful Improvements in Placer-Machines, of which the following is a specification.

My invention relates to what are generally termed placer machines which are adapted to the dry separation of precious metals from masses of dirt, sand, powdered quartz or ore &c., and while it is more particularly intended for this purpose it can be used for other purposes, such as the separation of sand, gravel, crushed rock and the like into various grades of fineness.

The object of the invention is to provide a simple, cheap and effective machine which is adapted for the purposes intended, and which may be used to separate the precious metals without loss from the various impurities usually associated therewith, and for separating other materials into various grades, and to make the device adjustable, and adapted for the particular purposes for which it is used.

It is furthermore an improvement on my prior patent No. 453,278, patented June 2, 1891, and the invention consists in the various features of construction and arrangement, and having the mode of operation, substantially as herein more particularly pointed out.

Referring to the accompanying drawings, Figure 1, is a longitudinal vertical section through a machine embodying my improvements; Fig. 2, is a plan view of the same, on line *x x* Fig. 2.

The sluice-way 1 consists essentially of an open trough provided with suitable levels and separating devices, and the whole is mounted on wheels 2, 3, preferably arranged at or near each end of the sluice-way. The sluice-way is arranged to be reciprocated in any suitable manner, and I have shown a connection or pitman 4, pivotally attached to the sluice-way preferably to the under side thereof, and to a crank 5, which is adapted to be rotated in any suitable way, as by the handle 6, or by any desired power, through the medium of belts, gears, or otherwise, which may be connected to the crank shaft 5, so that when the crank rotates, the sluice-way, and its contents will be moved with greater or less speed backward and forward to cause the more ready separation of the material therein.

I have shown the wheel 2 as mounted on a platform 7, connected to the framework 8, supporting the crank shaft 5, and this platform is provided with ridges or ribs 9, over which the wheels pass, so that besides the reciprocating motion, a jogging or jolting motion is given to the sluice-way. The wheels 3 are also shown as resting on a platform 10, likewise preferably having ribs or ridges 11, so that this end of the sluice-way is also subjected to the jolting or jarring action. This platform 10 is shown as resting on the ground on a level with the base or framework 8, but when desired it may be adjustably mounted as set forth in my former patent, so that the inclination of the sluice-way can be regulated, but I have not deemed it necessary to show it herein. It will thus be seen that when the crank shaft is operated, the sluice-way is bodily reciprocated and at the same time is submitted to the jolting action which tends to cause the materials to pass from the receiving box, and to be separated by the mechanism hereinafter described, and pass out at their proper places, and when the device is used for separating the precious metals, they being heavier are retained by the riffles and other devices in the sluice-way, and can be removed in the proper way.

Mounted on the sluice-way is a hopper 12, and this is shown as mounted on the framework 13, which is pivotally mounted as at 14, on the sluice box. This hopper discharges its material on to a screen 15, and the forward side of the hopper is shortened as at 16, so as to permit the passage of the material from the hopper on to the screen. The screen 15 consists of a frame having wire or other cross pieces to form the proper openings of the desired size, and this screen is made removable from the frame, being capable of being drawn outward, and another screen substituted in its place.

Connected to the frame 13 and pivoted thereon as at 17, is a sluice box 18, the bottom of which is on a level with the screen, and the discharge portion or mouth thereof 19, projects over and to one side of the sluice box. From this construction it will be seen that the frame carrying the hopper and the first sluice box can be raised from the sluice-way for the purpose of cleaning, or removing the material or otherwise, and that the sluice box can be raised to adjust or change the screen, and the material dumped into the hopper 12, will pass directly on to the screen, and the smaller particles of course will fall out of the screen on to the sluice-way 1, while the larger and coarser material will pass out of the sluice box 18 into the first dump.

The sluice-way is provided with a series of pins 20, projecting upward from the bottom thereof, and while these pins may be variously formed, I preferably make them of a small steel rod 21, having an enlargement 22 thereon, while their other ends are screw threaded, and pass through the base of the sluice way, and are secured by nuts 23. In this way I provide a strong and efficient pin which may be readily mounted in the sluice way, and removed when necessary, and when once secured, will be firmly held in position. Of course it will be understood that these pins may be arranged at various distances apart, and in various orders, they preferably being mounted as shown in transverse rows, forming longitudinal staggered rows or pins. Also mounted in the sluice-way are the riffles 24, there being more or less of these riffles placed in various positions according to the material being treated.

In the drawings I have shown each level of the sluice-way as being provided with three riffles, they being somewhat differently arranged in the different levels, but I do not limit myself to this or any other particular number or specific arrangement of them. Each riffle is pivoted to one side of the sluice-way by suitable means as the hinge 25, and a spring 26 is attached to the riffle, and to the side in such a manner as to hold the riffle normally elevated when not otherwise confined. The free ends of the riffles are provided with spring terminals 27, which are shown extending over one side of the sluice-way, and connected to this side are catches or hooks 28 adapted to engage the spring arms 27, and hold the riffles closely in proper position, but when the hooks are released, the riffles are raised by the spring 26, for convenience in cleaning the sluice-way.

Between the various levels of the sluice-way, I interpose other screens, and while I have shown in the drawings a sluice-way composed of two levels, and having two screens, it is evident that it may be provided with more levels, and more corresponding screens and sluice boxes connected thereto, depending upon the purposes for which the device is used. Thus I have shown a screen 30, which is arranged to slide in grooves in the sides of the sluice-way, so that screens of various sizes may be used, and pivotally connected to the sluice way adjacent to this screen, is a second sluice box 31 having its mouth 32 carried to one side to deposit the material not able to pass through the screen 30 into the second dump, while the finer material passing through the screen is deposited in the sluice-way, and the heavier portions are separated therefrom by the pins 20, and retained by the riffles 24, and the lighter portions pass out the end of the sluice-way into the final dump, if the machine is of the construction shown in the drawings.

In the construction shown in my former patent, all the material delivered to the hopper, and that was capable of passing through the sieve in the bottom thereof had to pass the whole length of the sluice box, and I have found this construction open to objection, in that when the hopper became obstructed by the larger particles of material which could not pass through the screen, it had to be bodily removed or otherwise emptied, which interfered with the operation. More than that, as all the material passing through the screen of the hopper had to pass over all the riffles, the process was comparatively slow and tedious. By the construction shown in my present invention, I avoid these difficulties in that I make one side of the hopper open, so that all material delivered to the hopper passes directly to the screen below it, and moving over the screens, the finer particles pass therethrough, while the coarser particles unable to pass through the screen are delivered by the sluice box, and from thence into the said dump, and I thereby accomplish the first and coarser separation at once, and get rid of the coarser material. As the material passes on to the two or three screens, the coarser material separated therefrom is also delivered into its respective dump, so that at the final dump at the end of the sluice box, only the material which is capable of passing through the finest screen is delivered, while the precious metals are retained in the sluice box as before set forth. Thus the process is quickened, and I find that it is practical to largely increase the amount of material treated with this construction, over that shown in my former patent. Moreover this is a special advantage in separating sand, gravel crushed stone &c. in that the different grades of fineness of the material will quickly and readily be delivered into the proper dump, without liability of mixing the same. Thus for instance the larger rocks are delivered from the sluice box 18, while the gravel may be delivered from the sluice box 31, and the fine sand or crushed stone from the ends of the sluice way.

I would remark that in the drawings I have shown the sluice way with practically level bottoms, and it may be used in this way in some conditions, or it may be inclined at any angle desired, so that the material will pass through the sluice-way more rapidly, it only being requisite that it should have time to be thoroughly separated before it is finally delivered.

While I have thus shown and described the preferred embodiment of my invention, it will be understood by those skilled in the art, that the details of construction, arrangement and operation may be varied to suit the requirements of any particular case and I do not therefore limit myself to the precise construction and arrangement shown.

What I claim is:

1. The combination with the reciprocating sluice-way having wheels at each end supporting the sluice-way, of supports for the wheels provided with ribs or ridges, means for reciprocating the sluice-way, a frame pivotally mounted on the sluice-way, a screen in the frame, and a sluice-box connected to the frame and having its mouth projecting laterally beyond the sluice-way whereby a combined reciprocating and jogging motion is given to the sluice-way and the material is screened, and the coarse material deposited on one side of the sluice-way, substantially as described.

2. The combination with the sluice-way, of a frame pivotally mounted thereon, a screen removably mounted in the frame and a sluice box arranged to dump the coarser material at one side of the sluice-way, the said sluice box being pivoted to the frame, substantially as described.

3. The combination with the sluice-way, of the riffles pivotally mounted to the side of the sluice-way, and provided with springs arranged to normally hold the riffles in a raised position, substantially as described.

4. The combination with the sluice way, of the riffles mounted thereon, the free ends of the riffles being provided with a spring arm, and hooks mounted on the sluice-way arranged to engage said spring arms and hold the riffles in place, substantially as described.

5. The combination with the sluice-way, of the pivoted riffles having springs for normally raising them, and spring arms arranged to engage the hooks attached to the sluice way for holding the riffles in place, substantially as described.

6. The combination with the sluice-way, of a series of pivoted frames, each frame being provided with a screen, and with a sluice box pivotally connected thereto and arranged to deliver the matter not passing through the screen to one side of the sluice-way, substantially as described.

7. The combination with the sluice-way, of means for imparting to it a jogging motion, a sluice-way provided with the separating pins and riffles, and a series of screens and sluice boxes, substantially as described.

In testimony whereof I have signed my name to this specification in the presence of two subscribing witnesses.

GEORGE MELVILLE REED.

Witnesses:
CHAS. P. GORELY,
H. HUNTER NEWTON.